United States Patent [19]
Jaksic et al.

[11] Patent Number: 5,748,816
[45] Date of Patent: May 5, 1998

[54] OPTICAL CAVITY FOR EXCLUSIVELY RECEIVING LIGHT PARALLEL TO AN OPTICAL AXIS

[75] Inventors: Zeljko Jaksic, Emmendingen; Hartmut Damm, Teningen; Christof Meyer, Gutach, all of Germany

[73] Assignee: Sick AG, Germany

[21] Appl. No.: 851,051

[22] Filed: May 5, 1997

Related U.S. Application Data

[63] Continuation of Ser. No. 517,945, Aug. 22, 1995, abandoned.

[30] Foreign Application Priority Data

Aug. 30, 1994 [DE] Germany ................. 44-30778

[51] Int. Cl.⁶ .................................................. G02B 6/26
[52] U.S. Cl. ........................... 385/39; 385/33; 385/901; 362/32
[58] Field of Search ........................ 385/39, 33, 34, 385/36, 901; 362/32; 359/601, 694

[56] References Cited

U.S. PATENT DOCUMENTS

| | | | |
|---|---|---|---|
| 5,018,832 | 5/1991 | Terunuma | 359/601 |
| 5,271,077 | 12/1993 | Brockman et al. | 385/39 X |
| 5,309,544 | 5/1994 | Saxe | 385/901 X |
| 5,339,382 | 8/1994 | Whitehead | 385/901 X |

FOREIGN PATENT DOCUMENTS

| | | |
|---|---|---|
| 0 065 159 | 11/1982 | European Pat. Off. . |
| 0 219 954 | 4/1987 | European Pat. Off. . |
| 0 617 389 A1 | 9/1994 | European Pat. Off. . |
| 9478 | 3/1955 | German Dem. Rep. . |
| 17 17 099 | 8/1955 | Germany . |
| 1 772 545 | 12/1970 | Germany . |
| 33 05 450 A1 | 8/1983 | Germany . |
| 40 42 053 A1 | 11/1991 | Germany . |
| 1 499 670 | 2/1978 | United Kingdom . |
| 2 163 550 | 2/1986 | United Kingdom . |

*Primary Examiner*—Phan T. H. Palmer
*Attorney, Agent, or Firm*—Townsend and Townsend and Crew

[57] ABSTRACT

A tube (1) is shown for coupling with, in particular, optical transmitter and/or receiver elements (2), and with means for suppressing interfering radiation, in which the means for suppressing interfering radiation consist of multiply reflecting surfaces (15) which absorb interfering radiation and which are formed by a plurality of ribs (11) which respectively extend substantially along a plane extending through the optical axis of the tube (1).

21 Claims, 4 Drawing Sheets

OPTICAL CAVITY FOR EXCLUSIVELY RECEIVING LIGHT PARALLEL TO AN OPTICAL AXIS

This is a continuation of application Ser. No. 08/517,945, filed Aug. 22, 1995, now abandoned, the disclosure of which is incorporated by reference.

The invention relates to an optical tube for coupling with, in particular, optical transmitting and/or receiving elements and having means for suppressing interfering radiation.

BACKGROUND OF THE INVENTION

Such tubes are used in sensor arrangements, for example in light barriers, with the receiver being coupled to the tube and with the transmitter either being separate from the tube or being likewise coupled to the tube and arranged in the area of the receiver. In the case of transmitters separate from the tube the radiation emitted by it passes into the tube through the tube inlet opening lying opposite to the receiver side of the tube and is detected by the receiver. If the transmitter is coupled to the tube then the emitted radiation is reflected outside of the tube back into the tube and is then detected by the receiver. As a rule a lens arrangement is located at the inlet opening of the tube which focusses the radiation incident into the tube onto the receiver, which is essentially arranged at the focal point of the lens arrangement.

Reflections can be caused in the interior of such tubes both by external radiation sources and also by the radiation emitted by the transmitter itself and can lead to an undesired increase in the quantity of radiation detected by the receiver. In this way the reliable operation of the sensor arrangement used in conjunction with the tube can be impaired. For trouble-free operation of such a sensor arrangement the interfering radiation which causes the undesired reflections and leads to an undesiredly high quantity of radiation being detected by the receiver must be suppressed, at least to an extent such that the manner of operation of the sensor arrangement is not impaired by the additional quantity of radiation.

It is known to form tubes for the suppression of interfering radiation as so-called light traps. For this the interior of the tube is provided with a plurality of sheet metal plates extending perpendicular to the optical axis of the tube which are formed as aperture diaphragms with diaphragm openings which become smaller along the optical axis of the tube in the direction of the incident radiation. A satisfactory suppression of interfering radiation can be achieved with a known arrangement of this kind. The manufacture of such tubes, which are of complicated construction, is however complicated and expensive, since a plurality of sheet metal plates must be inserted at precisely defined positions in a tube which has been separately manufactured earlier.

It is furthermore known to use tubes which can be manufactured by injection moulding process as light traps with the inner free cross-sectional area of the tubes reducing stepwise in the direction of the instant radiation along the optical axis of the tube. The suppression of interfering radiation achievable with such tubes is however poorer than with the above named tubes with sheet metal plates and does not enable an adequate protection against incident interfering radiation, in particular with shorter tubes.

SUMMARY OF THE INVENTION

It is an object of the invention to provide a tube which can be simply manufactured and which enables an adequate suppression of interfering radiation independently of its dimensions.

This object is satisfied in accordance with the invention essentially in that the means for suppressing interfering radiation consists of multiply reflecting surfaces which absorb interfering radiation and which are formed by a plurality of ribs which respectively extend substantially along a plane extending through the optical axis of the tube.

Through the invention a tube is provided in which the total multiply reflecting and absorbing surface is so enlarged by the ribs in advantageous manner that a plurality of individual surfaces arranged at angles to one another arises. These individual surfaces attenuate the instant interfering radiation through multiple absorption and reflection to such an extent that the residual interfering radiation which reaches the receiver can either be neglected in comparison with the emitted radiation from the transmitter which is to be detected, or lies beneath a specific threshold value.

In the case of the tube coupled to the receiver the invention thus ensures that essentially only the radiation of the transmitter disposed remote from the tube and only a negligible quantity of interfering radiation reaches the receiver. If, in contrast, a transmitter is coupled to the tube and has a specific output radiation characteristic, with the radiative angle of the transmitter being greater than the radiative angle desired for the respective application, then the invention makes it possible to block out the undesired portion of the radiation emitted by the transmitter in an advantageous manner.

In this way a reliable and troublefree manner of operation of the sensor arrangement used in conjunction with the tube of the application is always ensured.

A particularly effective suppression of interfering radiation is achieved in accordance with the invention in that the main ribs of the tube are respectively provided with additional side ribs which respectively extend at least regionally along the main ribs, whereby the surface of the tube which serves to suppress the interfering radiation is further enlarged, since additional absorbing and multiply reflecting surfaces are provided by the side ribs.

A still further improved suppression of the interfering radiation is achieved by the provision of these absorbing and multiply reflecting surfaces of the tube of the invention with a rough texture or with some other material which is particularly effective in absorbing radiation.

The manufacture of the tube in one piece in particular in a casting method and in particular using the injection moulding, pressure diecasting or gravity diecasting process is particularly advantageous since in this manner large numbers of the tube of the invention can be simply manufactured at favourable cost.

Further embodiments of the invention are set forth in the subordinate claims.

The invention will be described in the following by way of example and with reference to the drawing in which are shown:

DESCRIPTION OF THE PREFERRED EMBODIMENT

Figure 1:
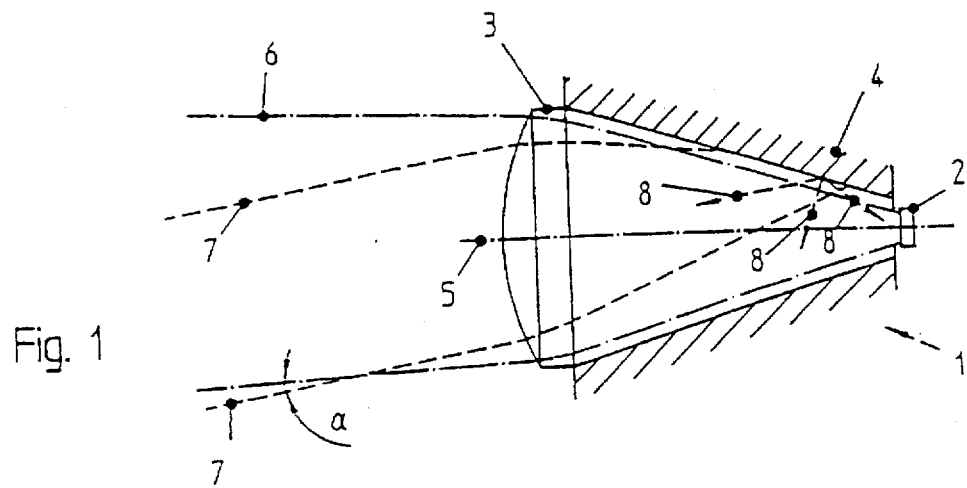
FIG. 1 is a general view and side elevation section of a cavity to explain the receipt of radiation.

FIG. 1 shows generally a sectional side view of a tube 1. Transmitter and/or receiver elements 2 are arranged at the base of the tube 1 and a lens arrangement 3 is located at the entry opening to the tube lying opposite to the base of the tube. The wall 4 of the tube is illustrated by hatching.

Radiation 6 which is incident essentially parallel to the optical axis 5 of the tube 1 is focussed by the lens arrangement 3 onto the transmitter and/or receiver elements 2 which are arranged substantially at the focal point of the lens arrangement 3.

Interfering radiation 7 which is incident at a pivotal angle α to the optical axis 5 is shown in broken lines. As a result of its oblique incidence, it strikes the tube wall 4 and is reflected by the latter. The reflected interfering radiation 8 propagates in the interior of the tube 1 and in this manner reaches the receiver element 2 where it is detected in undesired manner.

Figure 2:
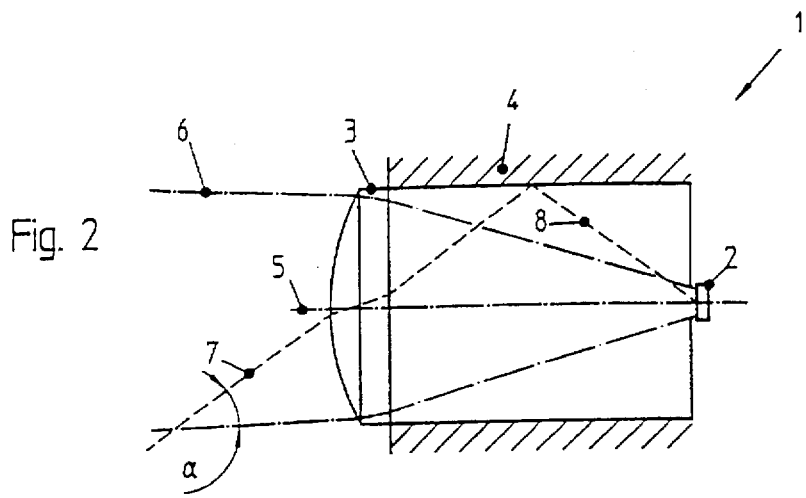
FIG. 2 is a side elevation section of a previously constructed cavity, illustrating the use of a cylindrical cavity for receiving radiation.

In FIG. 2 a known pot-like tube 1 is shown having tube walls 4 extending parallel to the optical axis 5. The tube 1 is provided with a receiver element 2 and the lens arrangement 3. The reference numeral 6 again indicates radiation which is incident essentially parallel of the optical axis 5 of the tube 1 which is focussed by the lens arrangement 3 and detected by the receiver element 2.

In this known tube interfering radiation 7 incident at a specific pivotal angle α is reflected at the tube wall 4 and the reflected radiation 8 is then undesirably detected by the receiver element 2.

Figure 3:
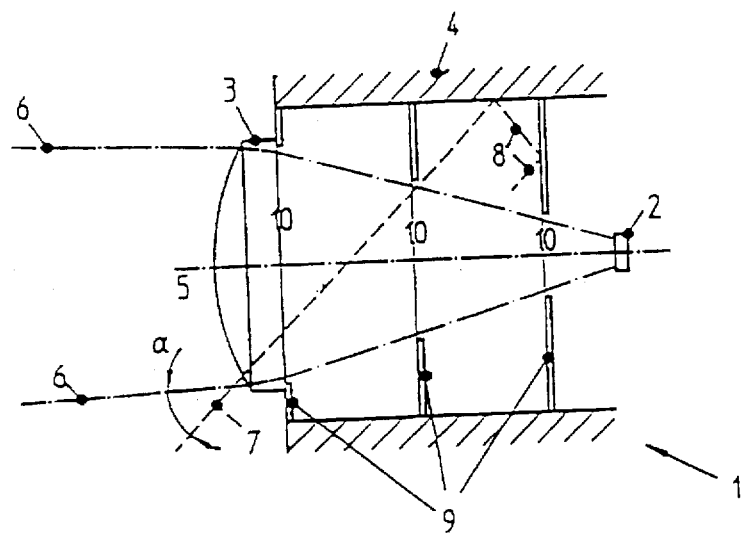
FIG. 3 is a side elevation section of a cavity having a baffle therein.

FIG. 3 shows a further, known, likewise pot-like tube 1 with a receiver element 2 and a lens arrangement 3 and is additionally provided with sheet metal plates which extend perpendicular to the optical axis and which are formed as aperture diaphragms arranged along the optical axis 5. The diaphragm apertures 10 of the sheet metal plates 9 reduce in size in the direction towards the receiver element 2.

Both the lens arrangement 3 and also the dimensions and the arrangement of the diaphragm apertures 10 are here selected so that the radiation 6 to be detected is fully detected by the receiver element 2 without reflections in the interior of the tube 1.

Interfering radiation 7 incident into the tube is, in contrast, in dependence on the angle of pivoting α, either reflected from one of the sheet metal plates 9 or, as shown in FIG. 3, first reflected by the tube wall 4 and then reflected again by one of the sheet metal plates 9 as reflected interfering radiation 8. Thus only a small part of the incident interfering radiation 7 which is reflected at the interior of the tube 1 at the tube wall 4 and at the sheet metal plates 9 passes through the last and smallest diaphragm aperture 10 disposed in front of the receiver element 2 to the receiver element 2.

Figure 4:
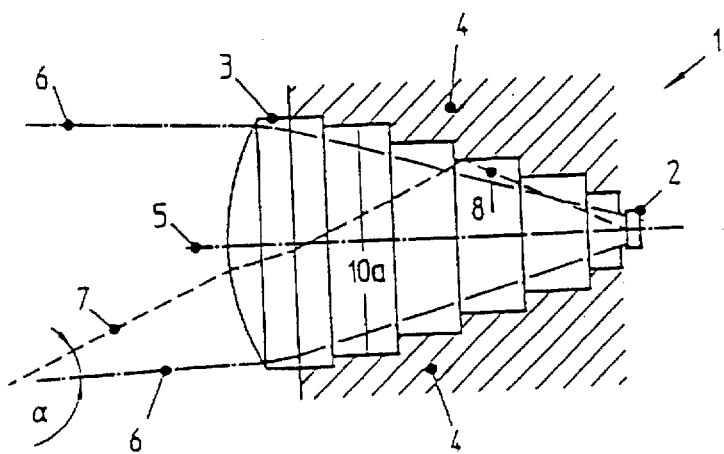
FIG. 4 is a side elevation section of a cavity having stepped surfaces therein.

FIG. 4 shows a further known tube 1 with a receiving element 2 and a lens arrangement 3. The walls 4 of the tube are so formed in step-like manner that free inner cross-sectional area of the tube 1 indicated in FIG. 4 by the the free internal diameter 10a of the tube 1 reduces stepwise in the direction towards the receiver element 2. As with the tube indicated in FIG. 3 the lens arrangement 3 and the tube wall 4 in the tube of FIG. 4, which is here of step-like design, are so formed that the radiation 6 to be detected which is incident substantially parallel to the optical axis 5 of the tube 1 passes fully to the receiver element 2 without reflection at the tube wall 4. Incident radiation 7 at an angle of pivoting α is in contrast reflected at the step-like tube wall 4 and, in dependence on the angle of pivoting α, the reflected interfering radiation 8 can, as shown in FIG. 4, already pass to the receiver element 2 and be detected by it in undesirable manner after only a single reflection at the tube wall 4.

Figure 5:
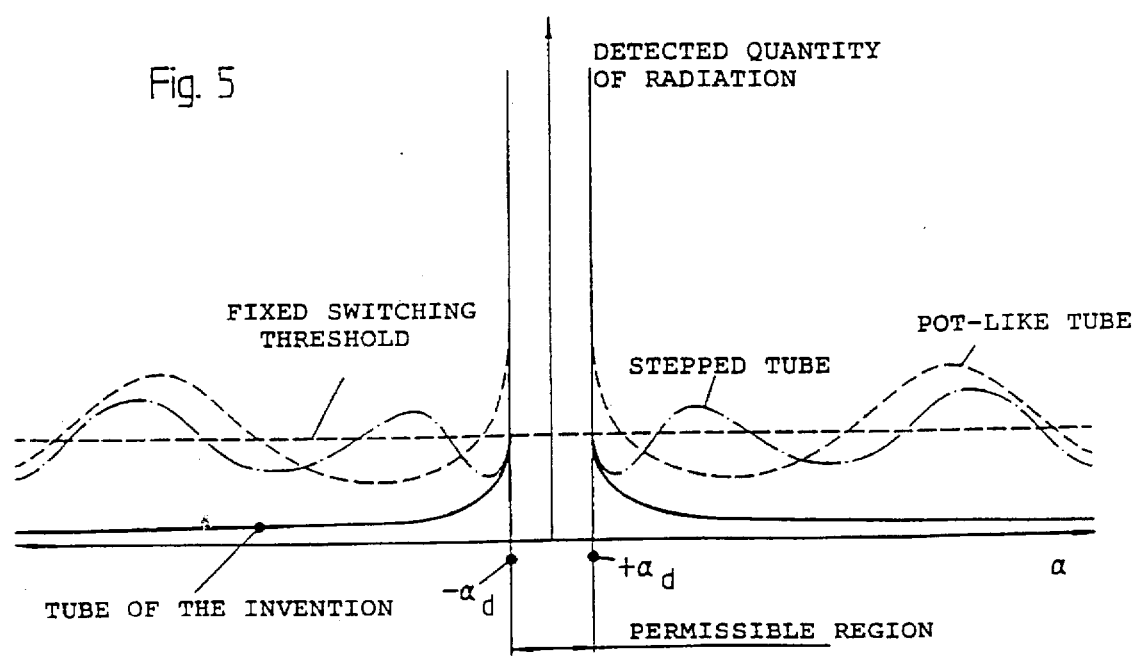
FIG. 5 is a graphic illustration of the quantity of radiation detected dependent upon the angle of incidence of the radiation for the tubes of the prior art, compared to the tubes of this invention.

FIG. 5 shows the dependence of the quantity of radiation detected by the receiver element of a tube on the angle of pivoting α. The permissible range of pivotal angles α designates that region in which radiation emitted by the transmitter element and incident into the tube should be detected by the receiver element. This permissible range thus includes the radiation which is incident essentially parallel to the optical axis of the tube.

In practice a specific angle of pivoting $\alpha_d$ is frequently set, up to which the incident radiation may be detected by the receiver element. This angle of pivoting $\alpha_d$ typically amounts to ±4° measured relative to the optical axis 5 of the tube. This requirement makes it necessary to prevent interfering radiation incident at an angle α in the regions α<−4° and α>+4° from passing to the receiving element arranged in the tube or coupled with the tube.

In accordance with FIG. 5 the quantity of radiation detected in this permissible region lies significantly above a fixed threshold of the receiver element represented by a horizontally extending broken line beyond which the receiver element transmits a signal which, for example, triggers a switching process as a response to the quantity of radiation detected by it.

It can be seen from FIG. 5 that for the known pot-like tube shown in FIG. 2 (here represented by a broken line) and for the tube shown in FIG. 4 with a step-like inner surface (here represented by a chain-dotted line) the quantity of radiation detected by the receiver element for angles of pivoting α outside of the permissible range lies regionally above the fixed threshold of the receiver element. In these regions the undesired interfering radiation which is additionally incident into the tube exceeds the fixed threshold of the receiver element whereby, in undesired manner, the latter, for example, triggers a switching process, whereby a troublefree manner of operation of a sensor arrangement used in conjunction with such tubes is impaired.

For a tube formed in accordance with the present invention the quantity of radiation detected is shown in FIG. 5 by a continuous line. For interfering radiation incident at angles α in the ranges α<−4° and α>+4° the quantity of radiation detected lies significantly below the fixed threshold of the receiver element so that the troublefree operation of the respective sensor arrangement is ensured by the tube of the invention.

Figure 6:
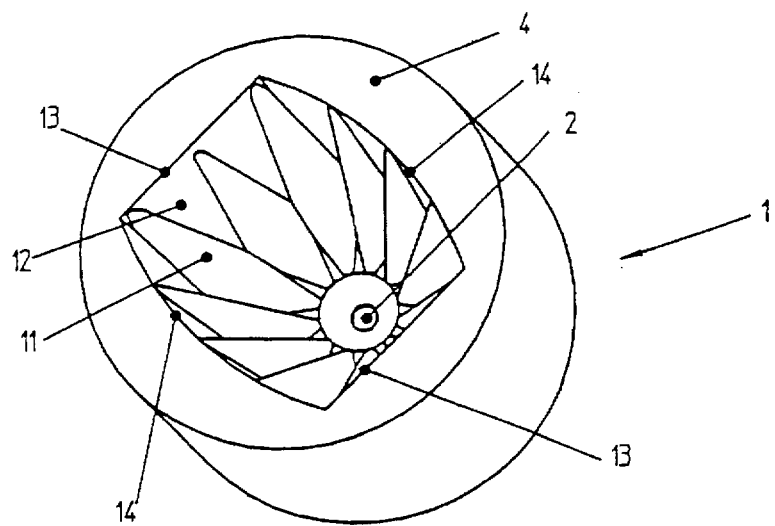
FIG. 6 is a perspective view of a tube in accordance with this invention, illustrating a typical group of ridges.

FIG. 6 shows a perspective view of the interior of a tube 1 formed in accordance with the present invention. Transmitter and/or receiver elements 2 which are only schematically indicated here are arranged at the base of the tube 1. In the interior of the tube 1 ribs 11 are formed at the tube wall 4 which respectively extend along a plane extending through the optical axis of the tube 1.

In the embodiment shown in FIG. 6 the ribs 11 which respectively extend substantially parallel to one another broaden out starting from the radiation inlet opening of the tube 1 and border on one another approximately at the center of their longitudinal extent, whereupon they taper again in the direction towards the transmitter and/or receiver elements 2. The ribs 11 can, if required, also border on one another over the entire length of the tube 1. The ribs 11 must not however necessarily extend parallel to one another but could rather, for example, be spaced apart from one another over the entire tube length and/or extend inclined to one another along the tube wall 4.

The tube of the invention shown in FIG. 6 has a circular outer cross-section, this can however also be different in adaptation to the transmitter arrangement used in conjunction with it and can for example in particular be made oval or square. The inner surface 12 of the tube 1 provided with the ribs 11 has, in the embodiment shown in FIG. 6, a cross-section formed of two parallel extending straight sides 13 of the same length and two oppositely disposed identical convex sides 14. The cross-section could however be different and could in particular be made circular, oval or square.

As a rule the tube 1 shown in FIG. 6 is used together with a lens arrangement which is however not shown for reasons of clarity in FIG. 6.

Figure 7:
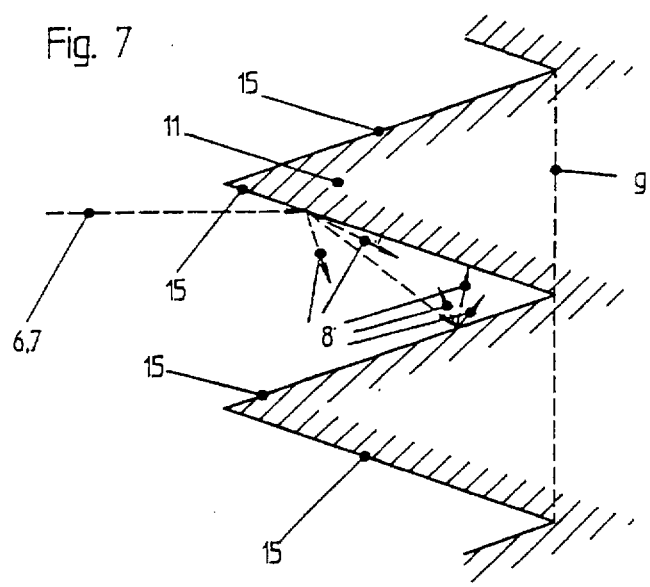
FIG. 7 is an enlarged sectional view of the ribs of the tube in accordance with the disclosure.

FIG. 7 shows a section of a cross-section through the ribs 11 of a tube in accordance with the invention. The ribs 11 illustrated here have a triangular cross-section could however have some other desired cross-section, for example a semicircular cross-section. The line g illustrated in broken lines in FIG. 7 designates the interior tube surface provided with the ribs 11.

It can be clearly seen from the illustration shown in FIG. 7 that the interior surface of the tube has been enlarged several times by the surfaces 15 of the ribs 11.

Radiation 6, 7 incident on the interior tube surface provided with the ribs 11 is reflected at the rib surface 15 and the radiation 8 reflected there is reflected anew at a further rib surface 15. Since a part of the incident radiation 6, 7 is absorbed by the rib surfaces 15 at each point of reflection the intensity of the incident radiation 6, 7 continually reduces by sequential reflections at the rib surfaces 15 which is indicated in FIG. 7 at the second point of reflection by the shorter arrows representing the twice reflected radiation 8.

Thus, the intensity of the incident radiation 6, 7 is attenuated by multiple absorption and reflection at the surfaces 15 of the ribs 11 to such an extent that only a negligible part of the initial intensity is not absorbed by the totality of the ribs 11 present in the tube and reaches the receiver element arranged at the base of the tube.

Figure 8A:
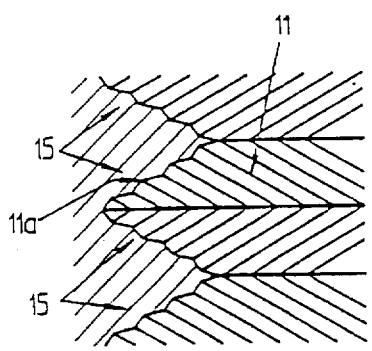
FIGS. 8a–8c are various embodiments of the ribs with FIG. 8a illustrating ribs of triangular cross-section, FIG. 8b illustrating ribs of essentially semicircular cross-section, so that a wave-like cross-section of the rib surfaces results and FIG. 8c illustrating the ribs having a roughened texture, with a large number of depressions, so that multiple reflections will absorb incident light.
Figure 8B:
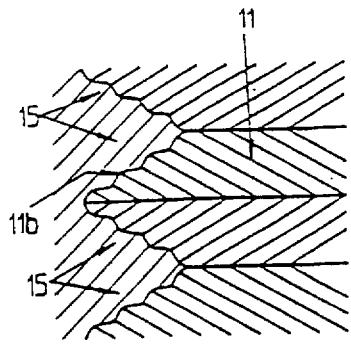
Figure 8C:
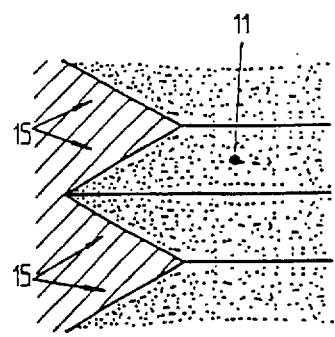

The FIGS. 8a–c show further embodiments of the ribs 11 of the invention.

In FIG. 8a the ribs 11 of triangular cross-section are respectively provided with additional smaller side ribs 11a which respectively likewise have a triangular cross-section. The surfaces 15 of the ribs 11 thus have a zig-zag-shaped cross-section in the embodiment shown here.

In FIG. 8b the ribs 11 which are triangular in cross-section are provided with additional side ribs 11b of essentially semicircular cross-section so that here a wave-like cross-section of the rib surfaces 15 results. The total surface of the tube interior and thus its radiation absorption capability is enlarged further in advantageous manner through the additional side ribs 11a and 11b which are formed on the ribs 11, which are executed as main ribs.

A further possibility in accordance with the invention for increasing the radiation absorption by the ribs 11 arranged in the tube is shown in FIG. 8c. Here the ribs 11 have a triangular cross-section and are not provided with additional ribs. In place of this in this embodiment the surfaces 15 of the ribs 11 are provided with a roughened texture indicated by dots, whereby a larger number of smaller depressions and elevated portions and thus additional smaller surfaces which absorb and reflect incident radiation is provided. In this manner the radiation which is incident in the tube can be suppressed more strongly.

Figure 9A:
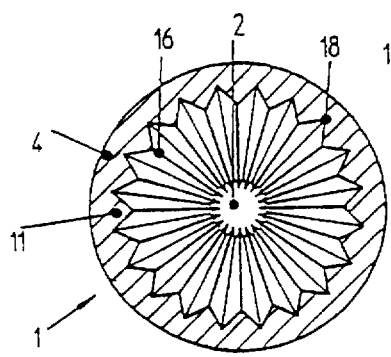
FIGS. 9a–9c illustrate exemplary plan views of the opening of the cavities, with the cavity of FIG. 9a being circular, the cavity of FIG. 9b being square, and the cavity of FIG. 9c being elliptical at the respective openings.
Figure 9B:
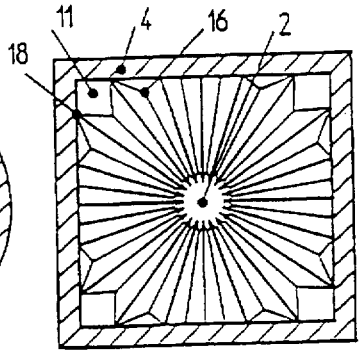
Figure 9C:
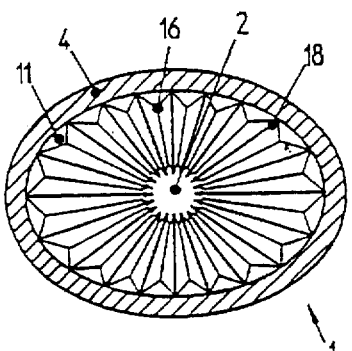

The FIGS. 9a–c show plan views onto the interior chambers of various tubes executed in accordance with the invention, with the transmitter and/or receiver elements 2 in each case being arranged at the base of the tube 1.

In FIG. 9a the tube 1 has a circular outer cross-section and the points 16 of the ribs 11 which are respectively disposed furthest inside the tube 1 lie, both in the plan view shown here, and also in each sectional plane, extending perpendicular to the optical axis of the tube 1, on an imaginary circular curve. As the ribs 11 have a triangular cross-section in this embodiment a free internal cross-sectional area of the tube 1 having a star-like outline results both in the plan view shown in FIG. 9a and also in each sectional plane extending perpendicular to the optical axis of the tube 1. In the embodiment shown here the points 18 of the ribs 11 which are disposed furthest outwardly respectively lie on a circular curve with the ribs 11 which form the interior surface of the tube 1 being identical to one another.

In the embodiment shown in FIG. 9a the free internal cross-sectional area of the tube 1, i.e. the cross-sectional area of the chamber bounded by the ribs 11 reduces along the optical axis in the direction towards the transmitter and/or receiver elements 2 arranged at the base of the tube 1, so that the ribs 11 which border on one another along the entire length of the tube taper in the direction towards the base of the tube. It is however also possible to keep the free internal cross-sectional area of the tube 1 constant along the optical axis of the tube. Ribs 11 which then border on one another over the entire length of the tube do not vary in width.

The ribs 11 can be at least regionally spaced from one another both in the case of a constant cross-sectional area of the tube 1 and also in the case of a reducing free internal cross-sectional area of the tube 1.

FIG. 9b shows a tube 1 in accordance with the invention with a square outer cross-section in which, as in the embodiment shown in FIG. 9a, the point 16 of the ribs 11 which are respectively disposed furthest within the tube 1 extend along a substantiall circular curve in each sectional plane extending perpendicular to the optical axis of the tube 1, while here the points 18 which are disposed furthest outwardly lie on a square curve so that the interior surface of the tube 1 is formed of ribs 11 of different cross-section.

In the embodiment shown in FIG. 9b both the free internal cross-sectional area of the tube 1 and also the width of the ribs 11 which border on one another over the entire length of the tube also reduce in the direction towards the transmitter and/or receiver elements 2. However, the free internal cross-sectional area can also remain entirely constant here and the ribs 11 can, if required, be spaced apart from one another.

FIG. 9c shows a further embodiment of a tube 1 in accordance with the invention in which both the outer cross-section of the tube 1, and also the curve on which the points 18 of the ribs 11 which are disposed furthest outwardly lie, have an oval form. The points 16 of the ribs which are respectively disposed furthest inwardly inside the tube 1 here lie in each sectional plane extending perpendicular to the optical axis of the tube 1 on a likewise oval curve. The width of the ribs 11 which here border directly on one another and also the free inner cross-sectional area of the tube 1 reduce, as in the embodiments shown in FIGS. 9a and 9b, in the direction towards the transmitter and/or receiver elements 2 arranged at the base of the tube. In this embodiment a constant remaining free internal cross-sectional area is also conceivable with ribs 11 which optionally only border on one another regionally or are spaced from one another.

In addition to the possibilities shown in the FIGS. 9a to 9c numerous other embodiments of the tube 1 of the invention are conceivable in which both the shape of the outer cross-section are matched to the circumstances present for the mounting of the tube 1 in the sensor arrangement, and also the shapes of the curves on which the points 18 or 16 of the ribs which lie furthest outwardly or furthest inwardly within the tube 1 are matched to the optical and geometrical requirements of the sensor arrangement used in conjunction with the tube 1 of the invention.

The FIGS. 10a–c and 11 respectively show a longitudinal section through different tubes 1 of the invention, in each case along a plane which extends through the optical axis 5 of the tube 1. The ribs 11 which are respectively arranged in the tubes 1 can thereby adopt one or other of the previously described shapes.

Figure 10B:
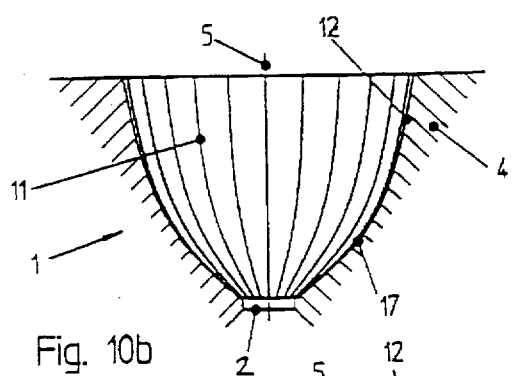
FIGS. 10a–10c are side elevation views of various shapes of cavities which can be used with the ribs herein, with FIG. 10a illustrating a cylindrical cavity, FIG. 10b illustrating a cavity having a paraboloid surface and FIG. 10c illustrating a truncated cone.
Figure 10A:
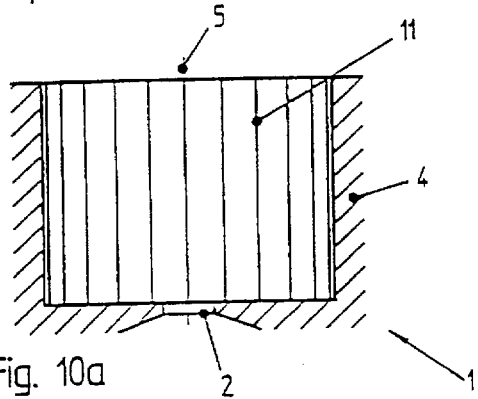

In FIG. 10a the free internal cross-sectional area of the tube 1 is constant over its entire length. The shape of the inner cross-section is in this embodiment the same in the region of the transmitter and/or receiver elements 2 at the base of the tube 1 as at the opposite tube end forming the radiation inlet opening of the tube 1.

In the embodiment of a tube 1 in accordance with the invention as shown in FIG. 10b its free internal cross-sectional area continuously reduces in the direction towards the transmitter and/or receiver elements 2 arranged at the base of the tube without the formation of undercuts and in this illustration a paraboloid-shaped intersection line 17 of the interior surface 12 of the tube results, with the free internal cross-sectional area however being optionally able to also reduce in such a way that any other curve-like line of the intersection 17 results, but no undercuts arise in the interior of the tube.

Figure 10C:
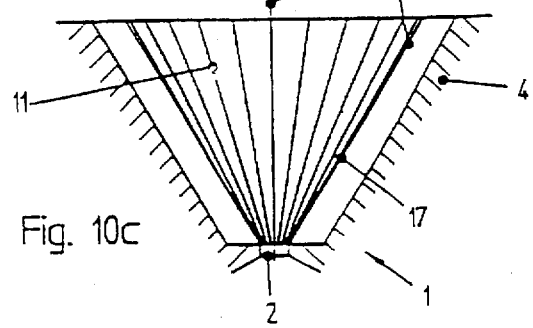

FIG. 10c shows a further embodiment in accordance with the present invention in which the free inner cross-sectional area of the tube 1 reduces in such a way that the free inner space of the tube 1 has essentially the shape of a truncated cone.

The transmitter and/or receiver elements 2 are respectively arranged in the embodiments of FIGS. 10b and 10c in the region of the smallest free cross-sectional area at the base of the tube 1.

Figure 11:
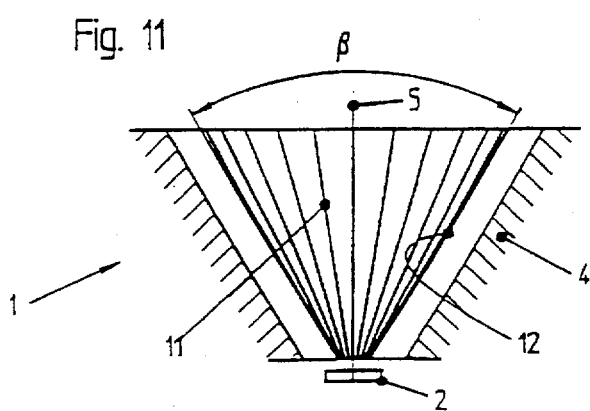
FIG. 11 is a side elevation section illustrating an opening angle beta imparted to the optical cavity there illustrated.

FIG. 11 shows, for the definition of an opening angle $\beta$, a tube in accordance with the invention with an essentially truncated cone-shaped free inner space, with the opening angle $\beta$ of this truncated cone being respectively adapted to the conditions which result from the optical and geometrical circumstances of the sensor arrangement used in conjunction with the tube 1 of the invention.

The above described embodiments of the interior of the tube in accordance with the invention in particular make it possible to manufacture the tube of the invention in one piece in a casting method and in particular in an injection moulding, pressure diecasting or gravity diecasting method, whereby large numbers can also be simply manufactured at favourable cost in advantageous manner.

In the embodiments of the tube 1 shown in the FIGS. 10a to c its outer cross-section which is respectively defined by the tube wall 4 can adopt any desired shape which corresponds to or deviates from the cross-section of the tubular inner surface 12 provided with the ribs 11 and/or to or from that of the curve on which the points 16 of the ribs disposed furthest inside the tube 1 lie in each sectional plane extending perpendicular to the optical axis 5 of the tube 1.

Figure 12:
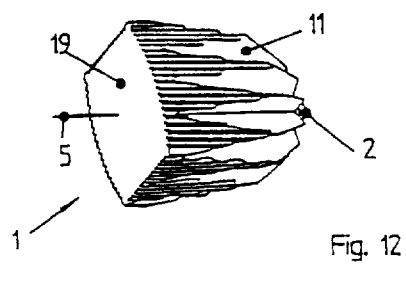
FIG. 12 is a perspective view of an optical cavity formed from solid material permeable to the respective received and/or transmitted radiation.

FIG. 12 shows a perspective view of a further embodiment of a tube in accordance with the invention with a transmitter and/or receiver element 2. The tube 1 is distinguished from the previously described embodiments in that its inner space consists of a solid material permeable for the respective radiation. The ribs 11 are formed here by machining the outer surface of the solid material. In this way all the designs of ribs, side ribs and tube inner space can likewise be achieved which were described in the preceding embodiments.

For the formation of the absorbing and multiply reflecting surfaces necessary for the suppression of the interfering radiation an absorbing and multiply reflecting coating is applied to the ribs 11 and is in particular formed by spraying on a mat black paint.

The non-coated inlet opening 19 of the tube 5 for the radiation which is incident parallel to the optical axis 5 of the tube 1 is either formed as a planar surface or as a concave or convex surface. The total inner space of the tube 1 can thus, so to say, act as a lens for focussing the incident radiation onto the receiver element 2 coupled to the tube 1. It is however also possible to provide the tube 1 shown in FIG. 12 with an additional lens element which is not shown here.

In each embodiment of a tube 1 formed in accordance with the present invention the optionally present lens arrangement 3 and the surface of the tube 1 formed by the surfaces 15 of the ribs 11 always cooperate for the most complete suppression possible of interfering radiation which is incident outside of the range of pivoting $\alpha$ of the permissible region, so that the radiation 6 which is incident essentially parallel to the optical axis 5 of the tube 1 and which has been emitted by a transmitter element is optionally focussed by the lens arrangement 3d and passes completely without reflections, and thus without intensity losses in the interior of the tube 1, to the receiver element 2 arranged at the base of the tube and is detected by the latter;

and so that incident interfering radiation which may eventually simultaneously arise is suppressed as fully as possible in the course of the multiple absorption and reflection processes which take place at the rib surfaces 15.

| Reference Numeral List | |
|---|---|
| 1 | Tube |
| 2 | Transmitter and/or receiver elements |
| 3 | Lens arrangement |
| 4 | Tube wall |
| 5 | Optical axis of the tube |
| 6 | Incident radiation |
| 7 | Incident interfering radiation |
| 8 | Reflected interfering radiation |
| 9 | Sheet metal plate |
| 10 | Diaphragm aperture |
| 10a | Free internal diameter of the tube |
| 11 | Ribs |
| 11a,b | Side ribs |
| 12 | Interior surface of the tube |
| 13 | Straight sides |
| 14 | Convex sides |
| 15 | Rib surfaces |
| 16 | Innermost rib points |
| 17 | Intersection line of the interior surface of the tube |
| 18 | Outermost rib points |
| 19 | Tube inlet opening |

We claim:

1. An optical tube for coupling with optical transmitter or receiver elements for transmitting or receiving radiation directed parallel to an optical axis and having means for suppressing interfering radiation substantially non parallel to the optical axis comprising:

an optical cavity formed symmetrically about the optical axis, the optical cavity defining an open end for receiving radiation and a closed end communicating to the transmitter or receiver elements;

a transmitter or receiver element on the optical axis mounted to the closed end of the optical cavity for respectively transmitting or receiving radiation parallel to the optical axis;

the optical cavity having a shape for causing light parallel to the optical axis to be respectively reflected from the transmitter or reflected to the receiver;

interior reflecting ribs in the walls defining the optical cavity, the interior ribs having ridges each respectively disposed substantially along a plane extending through the optical axis for producing at least multiple wall reflections between the open end and the transmitter or receiver elements for at least attenuating radiation non parallel to the optical axis.

2. An optical tube according to claim 1 and wherein: the optical cavity is a hollow optical cavity.

3. An optical tube according to claim 1 and wherein: the optical cavity consists of solid material permeable to radiation; and, the interior ribs being formed by the outer surface of the cavity.

4. An optical tube according to claim 1 and wherein: the interior ribs define multiple surfaces which absorb radiation.

5. An optical tube according to claim 1 and wherein: the interior ribs have a triangular cross-section.

6. An optical tube according to claim 1 and wherein: the interior ribs having a semi-circular cross-section.

7. An optical tube according to claim 1 and wherein: the interior ribs have multiple auxiliary reflecting ribs.

8. An optical tube according to claim 1 and wherein: the interior ribs are provided with a surface having a rough texture.

9. An optical tube according to claim 1 and wherein: the interior ribs have a length and a cross-section which varies over their respective length.

10. An optical tube according to claim 1 and wherein: the interior ribs have a length and a cross-section which is the same over the length of the interior ribs.

11. An optical tube according to claim 1 and wherein: the interior ribs have the same cross-section in planes taken parallel to the optical axis.

12. An optical tube according to claim 1 and wherein: the interior ribs extend parallel to one another.

13. An optical tube according to claim 1 and wherein: the interior ribs adjoin one another.

14. An optical tube according to claim 1 and wherein: the optical cavity has a circular section along planes taken normal to the optical axis.

15. An optical tube according to claim 1 and wherein: the optical cavity has an elliptical section along planes taken normal to the optical axis.

16. An optical tube according to claim 1 and wherein: the optical cavity has a square cross-section along planes taken normal to the optical axis.

17. An optical tube according to claim 1 and wherein: the cross-section of the optical cavity decreases from the opening of the cavity to the transmitter or receiver elements.

18. An optical tube according to claim 1 and wherein: the cross-section of the optical cavity taken parallel to the optical axis comprises a parabloid.

19. An optical tube according to claim 1 and wherein: the cross-section of the optical cavity taken parallel to the optical axis comprises a truncated cone.

20. An optical tube according to claim 1 and wherein: the outer cross-section of the tube is other than round.

21. An optical tube according to claim 1 and wherein: a lens affixed adjacent the opening of the optical cavity for transmitting radiation to the transmitter or receiver elements.

* * * * *